(12) United States Patent
Boice

(10) Patent No.: US 7,011,286 B2
(45) Date of Patent: Mar. 14, 2006

(54) BAG VALVE

(76) Inventor: Nelson Boice, 534 Manor Rd., Maitland, FL (US) 32751

( * ) Notice: Subject to any disclaimer, the term of this patent is extended or adjusted under 35 U.S.C. 154(b) by 0 days.

(21) Appl. No.: 10/955,423

(22) Filed: Oct. 1, 2004

(65) Prior Publication Data

US 2005/0285063 A1 Dec. 29, 2005

Related U.S. Application Data

(60) Provisional application No. 60/583,356, filed on Jun. 29, 2004.

(51) Int. Cl.
  *F16K 7/04* (2006.01)
  *E03B 13/02* (2006.01)

(52) U.S. Cl. .......................... 251/4; 138/89; 239/451; 239/546; 405/40; 405/42

(58) Field of Classification Search .................... 251/4, 251/5, 6, 7, 8, 9, 10; 137/800; 239/451, 239/546; 405/36, 40, 42; 138/45, 89, 96 R
See application file for complete search history.

(56) References Cited

U.S. PATENT DOCUMENTS

| | | | | | |
|---|---|---|---|---|---|
| 96,862 | A | * | 11/1869 | Allen | 239/546 |
| 2,094,707 | A | * | 10/1937 | Jones | 138/45 |
| 2,835,272 | A | * | 5/1958 | Taupin | 251/4 |
| 2,959,359 | A | * | 11/1960 | Casaletto | 239/455 |
| 3,329,390 | A | * | 7/1967 | Hulsey | 251/4 |
| 3,624,801 | A | * | 11/1971 | Gannon | 251/5 |
| 3,776,470 | A | * | 12/1973 | Tsuchiya | 239/546 |
| 3,923,210 | A | * | 12/1975 | Jackson | 222/494 |
| 4,427,024 | A | | 1/1984 | Gregory et al. | |
| 5,637,211 | A | | 6/1997 | Neff | |
| 6,758,238 | B1 | | 7/2004 | Callies | |

* cited by examiner

*Primary Examiner*—John Rivell
(74) *Attorney, Agent, or Firm*—Elsie C. Turner

(57) ABSTRACT

The bag valve comprises an open-ended sleeve of pliant impermeable material, one end of which is removably clamped around the down-stream open end of a conduit for fluids. The other end of the sleeve, the downstream end, can be gathered into a fully or partially closed configuration by a drawstring around the downstream sleeve end. A resilient stopper may be attached inside the downstream end of the conduit, against which the drawstring is biased when fully tightened, in order to minimize leakage from the sleeve. A cleat may be attached to the outside of the conduit for more easily securing the drawstring ends when the valve is partially or totally closed.

4 Claims, 2 Drawing Sheets

BAG VALVE

BACKGROUND OF THE INVENTION

This application claims the benefit of a prior-filed provisional application Ser. No. 60/583,356, filed Jun. 29, 2004.

FIELD OF THE INVENTION

This invention pertains to valves for controlling the flow of fluids, typically water or fluid fertilizer in flood irrigation for agricultural crops. More particularly, it provides a low-cost and low maintenance device for regulating fluid flow.

Valves used in irrigation pipes are of various types, depending on their function, and have been well-known for many decades. Pertinent to the present invention are two categories: on-off service valves and throttling valves.

On-off service valves include gate valves, plug valves, and ball valves. Of these, the gate valve is the most common. It consists of wedge attached to the valve stem or shaft which is either threaded and turned, or slid up or down through the action of a mechanical lever, to change the position of the wedge. This type of valve is not generally used for throttling of flow. Plug and ball valves are similar in that the flow control element has a transverse channel which permits flow when the channel is aligned with the pipe and shuts off when turned 90°.

Throttling valves provide a linear flow response when partially closed. Various types of throttling valves are known in the art: globe, angle, "Y", needle, pinch, diaphragm, and butterfly valves. The action of each of these is more particularly described in the following publication: Haman, Izuna and Clark, *Valves in Irrigation Systems*, IFAS Ext. Cir. 824, Univ. of Fla., (1989).

All these valves are typically made of machined metal parts, the operative closing or limiting device being inside the body of the valve, which is in turn inside the conduit transporting the irrigation fluid. If solid particles enter the conduit, they can clog any of these valves and prevent them from performing their function. Thus filters are usually required to remove such particles. Furthermore, metallic valves are subject to corrosion. Replacement usually involves cutting out the existing valve and refitting using adhesives that take time to set.

Accordingly, it is an object of this invention to provide a combination on-off and throttling valve for controlling fluid flow.

Another object of this invention is to provide a lower-cost and non-corrosive alternative to conventional metallic valves, more particularly, a valve made of pliant rather than rigid material.

Still another object of this invention is to provide a valve that can be easily and quickly replaced with a minimum of labor.

Still another object of this invention is to provide a valve that can be easily inspected for, and purged of, clogging material or other problems.

Still another object of this invention is to provide a valve with a throat as large as, or larger than, the conduit itself to allow use of the valve and conduit as a water conveyor for fruit and other products.

SUMMARY OF THE INVENTION

The invention comprises an open-ended sleeve of pliant waterproof material, one end of which is removably clamped around the down-stream open end of a conduit for fluid. The other end of the sleeve, the downstream end, can be gathered into a fully or partially closed configuration by a drawstring. A resilient stopper is attached inside the downstream end of the conduit, against which the drawstring is biased when fully tightened, in order to minimize leakage from the sleeve. An optional cleat may be attached to the outside of the conduit for securing the ends of the drawstring when the valve is partially or totally closed.

BRIEF DESCRIPTION OF THE DRAWINGS

FIG. 3 is a sectional view taken from line 3—3 of FIG. 1.

DETAILED DESCRIPTION OF THE DRAWINGS

Figure 1:
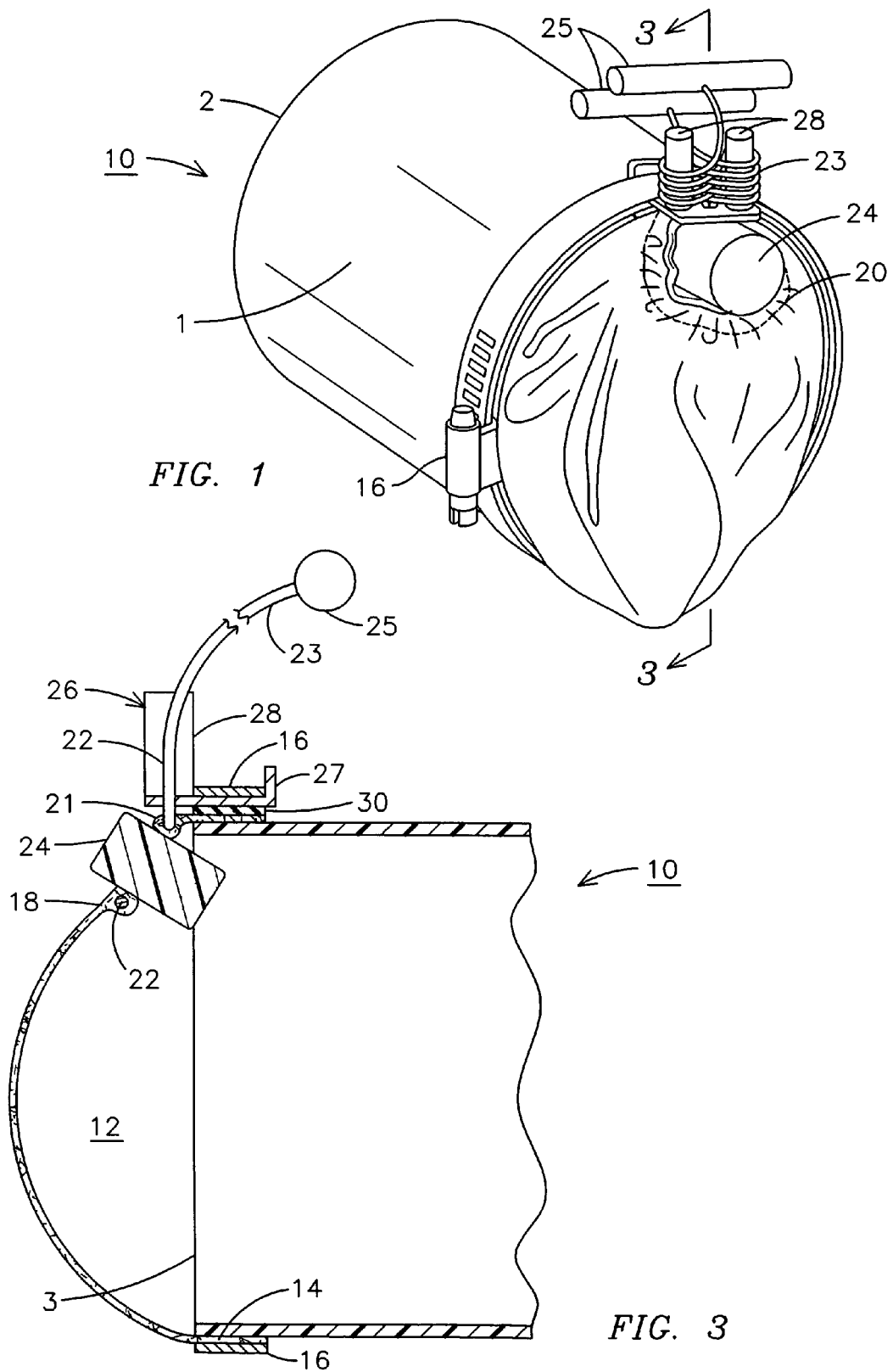
FIG. 1 is a perspective view of my invention, the bag valve being closed.
Figure 2:
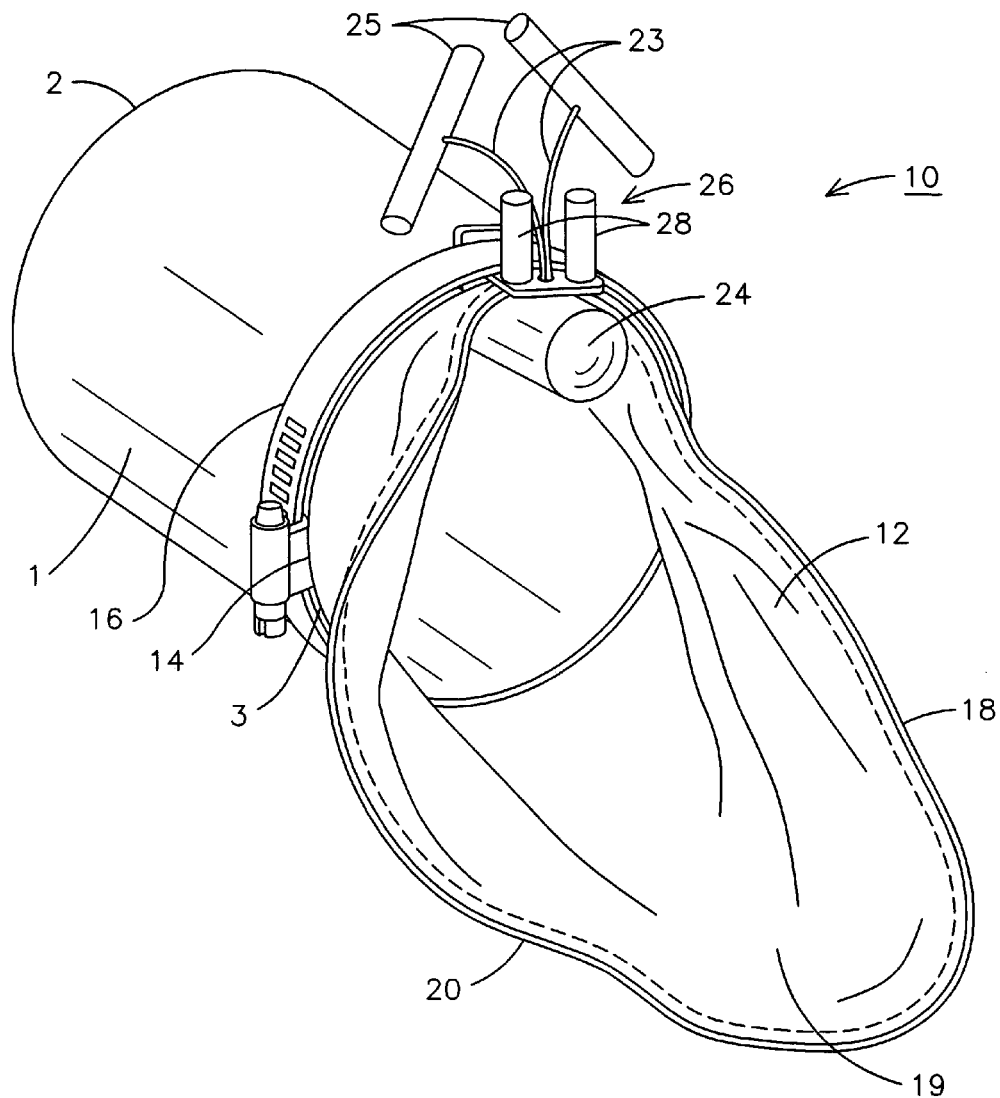
FIG. 2 is a perspective view of the bag valve in an open configuration.

As depicted in FIGS. 1–3, the present invention 10 is a bag valve for controlling the flow of fluid under pressure, particularly adapted for use in various agricultural irrigation systems. FIG. 1 shows a length of pipe 1 connected at its upstream end 2 to a source (not shown) of fluid, such as water. Typically the pipe will be formed of a modern durable plastic suitable for industrial or agricultural use, and the pipe will lie more or less horizontally on the ground. The downstream end 3 of the pipe is open, with the invention 10 mounted thereon. In FIGS. 1 and 3, the bag valve is closed, and in FIG. 2, it is open.

The valve is comprised of a sleeve 12 of a pliant waterproof material, open at both ends, having one end 14 configured to snugly fit around end 3 of pipe 1. End 14 of sleeve 12 is preferably secured to pipe 1 by a hose clamp 16, which makes the invention 10 easily removable. However other means of securing the sleeve 12 to the pipe, such as adhesives or other clamping devices including twistable wire, could obviously be used. The sleeve could be secured to either the outside or the inside of the conduit. In FIGS. 1–3, the opposite end 18 of sleeve 12 has a casing 20 around its circumference which houses a drawstring 22 for drawing sleeve end 18 into the closed position of FIGS. 1 and 3, or into a partially closed configuration. Alternatively, drawstring 22 could be threaded through loops attached to sleeve end 18 or small openings therein. The drawstring 22 should be pliant and tough. Heavy monofilament nylon fishing line is a suitable choice.

Since a drawstring may not completely seal the opening of the bag, in order to minimize water leakage from sleeve 12, a stopper 24, preferably of rubber, may be attached to the bag at sleeve end 18 to provide a surface against which the drawstring 22 can be biased when tightened. Any resulting seepage from the closed bag is slight and not objectionable.

After restricting the opening to the desired degree, the drawstring 22 may be secured by various means, including tying the ends in a simple square knot. For convenience, because heavy fishing line is not particularly easy to tie, a cleat 26, comprised of a base plate 27 with bollards 28, is provided for making fast either one or both ends 23 of drawstring 22. As shown in FIG. 2, the drawstring ends 23 exit the casing at hole 21 and pass up through a hole 29 in the base plate 27. One end can be prevented from pulling out of the hole by knotting it or melting it to form a ball larger than the hole, or both ends can be fitted with toggles 25 for ease in grasping them and pulling drawstring 22 as tight as possible, as well as for preventing ends 23 from being accidentally drawn into casing 20.

Cleat 26 is held in place by hose clamp 16 on the upper surface of pipe 1 at its downstream end 3. A flat pliant, resilient rubber filler 30, analogous to a washer, should be placed under the base plate 27 so that when the hose clamp 16 is tightened, pressure is uniformly transmitted through cleat 26 and through filler 30, to sleeve end 18, thus sealing the bag 12 to pipe 1.

As seen in the drawings, sleeve end 18 has a diagonal cut relative to its long axis, defining an elliptical opening rather than a round one, having a lower portion 19 longer than the upper portion where the cleat 26 is positioned. Thus when drawstring 22 is tightened, lower portion 19 is gathered in and upward to reach stopper 24.

There is a significant cost advantage in using the present invention, rather than expensive metal gate valves. A valve of pliant material has a significant cost advantage in initial cost, handling, storing inventory, distribution and shipping. Another advantage of the bag valve is its ease of installation and removal simply by fastening or releasing hose clamp 16. Should any solid material enter the pipe and interfere with the flow of water, the valve is always visible, can be easily inspected, opened or removed to gain access to the obstruction. Expensive filters should not be necessary.

What is claimed is:

1. A valve for controlling flow of fluid through a conduit, said conduit having an upstream end and a downstream end, said valve comprising:
   an open-ended sleeve of pliant impermeable material having an upstream end and a downstream end;
   a clamping device for sealing said upstream end of said sleeve to said downstream end of said conduit;
   a casing integral with said downstream end of said sleeve, said casing enclosing a drawstring having opposing ends, said downstream end of said sleeve having a bottom portion and a top portion, said bottom portion being longer than said top portion, said ends of said drawstring exiting said casing at said top portion, whereby pulling said ends gathers said downstream end of said sleeve into a closed or partially closed configuration adjacent said top portion; and
   a resilient stopper attached to said top portion within said sleeve, whereby fully tightening said drawstring ends will bias said casing against said stopper thereby minimizing leaking of fluid from said valve.

2. A valve for controlling flow of fluid through a conduit, said conduit having an upstream end and a downstream end, said valve comprising:
   an open-ended sleeve of pliant impermeable material having an upstream end and a downstream end;
   a removable clamping device for sealing said upstream end of said sleeve to said downstream end of said conduit;
   a casing integral with said downstream end of said sleeve, said casing enclosing a drawstring having opposing ends, said downstream end of said sleeve having a bottom portion and a top portion, said bottom portion being longer than said top portion, said ends of said drawstring exiting said casing at said top portion, whereby pulling said ends gathers said downstream end of said sleeve into a closed or partially closed configuration adjacent said top portion.

3. The invention according to claim 2 further comprising a resilient stopper attached to said top portion within said sleeve whereby maximum tightening of said ends of said drawstring biases said casing against said stopper thereby minimizing leaking of fluid through said valve.

4. The invention according to claim 3 further comprising means for fastening said ends of said drawstring after the downstream end of said sleeve is gathered to restrict flow.

* * * * *